United States Patent [19]

Kolze

[11] Patent Number: 5,299,775
[45] Date of Patent: Apr. 5, 1994

[54] FLOW MODULATING CONTROL VALVE ASSEMBLY

[75] Inventor: Lawrence A. Kolze, Seneca, S.C.
[73] Assignee: Kolze, Inc., Seneca, S.C.
[21] Appl. No.: 775,493
[22] Filed: Oct. 15, 1991
[51] Int. Cl.$^5$ .......................................... F16K 31/385
[52] U.S. Cl. .................................. 251/30.03; 251/38; 251/45
[58] Field of Search ..................... 251/30.03, 30.04, 38, 251/45

[56] References Cited

U.S. PATENT DOCUMENTS

| | | | |
|---|---|---|---|
| 4,429,708 | 2/1984 | Strueh | 251/30.03 X |
| 4,623,118 | 11/1986 | Kumar | 251/38 X |
| 4,699,351 | 10/1987 | Wells | 251/44 X |
| 4,793,589 | 12/1988 | Eldredge et al. | 251/30.03 |
| 4,863,098 | 9/1989 | Kolze et al. | 251/30.03 X |
| 4,995,586 | 2/1991 | Gensberger et al. | 251/30.04 |
| 5,048,790 | 9/1991 | Wells | 251/30.04 X |

Primary Examiner—Gerald A. Michalsky

[57] ABSTRACT

A flow modulating fluid control valve assembly utilizing a spring biased armature to directly operate a pilot passage in a main flow control valve. An electromagnetic coil assembly opens the valve by shifting the armature and its seal away from the pilot passage allowing the control valve to open and follow the armature until its seal again restricts the pilot passage and achieves a new force balance position for the control valve. Precise modulation is achieved by shaping the force vs. displacement curves for the electromagnetic assembly opening force acting on the armature and the same curve for the spring and other forces acting in a closing direction on the armature so they have substantially different slopes and intersect at a locus of points in the operating range of movement of the armature.

6 Claims, 5 Drawing Sheets

VARIABLE VOLTAGE, VARIABLE FLOW SOLENOID VALVE, TYPICAL VOLTAGE VS FLOW

Fig. 4

CONVENTIONAL OPEN/CLOSE PILOT OPERATED VALVE ARMATURE FORCE/DISPLACEMENT DIAGRAM

PRIOR ART

MODULATION VALVE ARMATURE FORCE/DISPLACEMENT DIAGRAM

FLOW MODULATING CONTROL VALVE ASSEMBLY

BACKGROUND OF THE INVENTION

Pilot operated diaphragm valves have had considerable success in both consumer and industrial hydraulic systems. For example, they have been used in mixing valve assemblies in the past for many years in clothes-washing machines for mixing predetermined proportions of hot and cold water to provide the appliance with the desired temperature water, as well as controlling the flow rate of the water supplied.

Typically, these mixing valves include two diaphragm operated valves, one for cold water and one for hot water with some type of control system for actuating either the hot or cold water valve, or for actuation of both valves to give a mix of the hot and cold fluids. These valves are very limited in mix temperature control due to effects of different inlet pressures of the hot and cold, water temperature variables, and different flow pressure drops through each section of the mixing valve itself. Thus, outlet mix temperature of these valves is solely dependent upon whatever the full flow hot and cold valves will provide for the given variables and, therefore, little control of actual mix temperature is achieved.

Other previous mixing valves did provide control of the hot and cold mix temperature through a mechanical sensor/actuator which provided a selectivity of mix temperatures achieved by proportioning the hot and cold fluids from the solenoid operated valves in a mechanically proportioning mixing chamber. In these mixing valves, the hot and cold pilot operated valves were also either fully "on" or "off" and depended upon the thermostatically controlled mixing chamber to achieve some desired degree of mix temperature.

In the past these valves have included pilot operated diaphragm valves with actuators that control on/off flow through a pilot passage extending through the diaphragm and the position of this actuator has been controlled by an electromagnet. These prior diaphragm operated valves, however, have been found only useful in positioning the main diaphragm valve in either a fully opened or fully closed position because attempts in attaining modulating capability of these valves at the pilot valve orifice has been unreliable since the pilot valve under these conditions has been found to have an inherent propensity to inadvertently close and cause premature main valve closure, especially upon transient current or voltage surges through the electromagnetic coil or because of transient pressure surges at the valve inlet.

One such pilot operated diaphragm valve is disclosed in the McCarty, Jr., et al., U.S. Pat. No. 3,672,627, and it includes a diaphragm operated main valve for controlling flow between an inlet and an outlet with one side of the diaphragm being exposed to inlet pressure and the opposite side of the diaphragm forming an intermediate chamber in the housing in which fluid pressure is controlled by an electromagnetic coil driven actuator reciprocal in the housing having a pilot seal at its inner end that selectively blocks flow through a central pilot passage in the main diaphragm valve.

With the electromagnetic coil de-energized, the actuator is biased by a coil spring to close this pilot passage and when fluid is introduced at the valve inlet, it is free to move into this intermediate chamber through a continuously open small offset passage extending through the diaphragm.

The intermediate chamber is then at a higher pressure than the outlet and the main diaphragm valve assembly is urged to its shut-off position due to the differential area caused by the main valve seat and the biasing force of the coil spring acting on the electromagnetic actuator armature.

When the windings of the electromagnetic coil are energized, the magnetic flux generated thereby moves the ferromagnetic actuator away from the diaphragm against the biasing force of the coil compression spring and fluid differential pressure force to unseat the pilot seal from the pilot passage in the diaphragm permitting flow through the pilot passage from the intermediate chamber to the outlet. This, of course, results in a reduction in pressure in the intermediate chamber and when the fluid pressure differential acting on the lower side of the diaphragm and the upper side of the diaphragm (intermediate chamber pressure) is sufficient, the diaphragm assembly, and hence the main valve will move upwardly away from the main valve seat permitting high pressure fluid to flow directly from the inlet to the outlet.

Because of the high initial current flow through the coil required to raise the actuator against the bias spring force and pressure differential force and cause opening movement of the main diaphragm valve assembly, the actuator will continue to move a considerable distance away from the diaphragm assembly until the magnetic actuation forces reach equilibrium with the spring force. This equilibrium point positions the actuator almost entirely within an associated guide bore in the coil assembly so that there is no modulation or restriction between the actuator seal and the pilot passage during this movement. The following diaphragm assembly then moves away from the main valve opening until it abuts a stop.

While the McCarty, et al. valve has been employed commercially solely as an on-off flow control valve as completely described in their patent, there have been unsuccessful experimental attempts to utilize the McCarty, et al. valve as a flow modulating valve. In these attempts, current flow through the coil was reduced after the initial high current flow to overcome the forces acting on the closed actuator, permitting the actuator to move downwardly as a result of the diminution in the flux field acting on the actuator. As the actuator and its pilot seal move toward the pilot passage, the differential pressure between the valve inlet and the intermediate chamber is reduced to achieve main flow modulation. The pressure drop across the pilot seal however, increases due to the flow restriction caused by the close proximity of the pilot seal to the pilot passage. The proximity of the pilot seal to the pilot passage is critical to where modulation of the main valve can be maintained without the pressure drop force across the pilot seal increasing to a valve wherein an inadvertent shut-off of the pilot passage occurs.

Because the main valve appeared to follow the actuator, the McCarty, et al. diaphragm valve assembly, at first blush, appeared capable of operating as a modulating valve with the appropriate reduction of coil current after opening. However, testing the McCarty, et al. valve in attempted modulating positions, particularly when a high differential pressure exists across the diaphragm, indicated the valve assembly to be very unstable not only under transient changes in inlet pressure, and transient current surges through the coil, but when tried under most controlled coil voltages and pressures.

I have found this instability to result from the close proximity of the actuator pilot seal from the pilot passage in the main diaphragm valve assembly when the actuator and valve are attempted to be put into modulating equilibrium position. In an exemplary modulating equilibrium position, the main valve assembly is open and the actuator seal is closely spaced to the diaphragm pilot passage so that its pilot seal is restricting flow through the pilot passage. The pilot actuator is stationary because the electromagnetic flux force is held constant for that position and is balanced by the force of the spring and the axial differential pressure acting thereon. At this time the diaphragm is in a stationary position because the differential pressures acting on the diaphragm's upper and lower surfaces produces a force balance.

The requirement for the seal being very close to the pilot opening in this balance position is due to the fact that the seal must be this close to sufficiently restrict pilot flow through the pilot passage to achieve the proper balance of forces acting on the main valve. The instability is also accentuated by the fact that there is a net downward differential pressure force acting on the actuator in this equilibrium position urging it to its closed position blocking flow through the pilot passage of the valve. This net differential pressure force is caused by the restriction established at the actuator seal area of the diaphragm pilot passage and acts across the area of the actuator seal immediately adjacent the pilot orifice to create a downward force on the actuator. In this nearly closed position of the actuator seal, any transient increase in inlet or intermediate chamber pressure increases the differential pressure and downward force acting on the actuator frequently causing inadvertent shut-off. The same result occurs from a transient drop in coil current.

While the McCarty, et al. valve is an excellent design for an on-off valve for which it is intended when originally designed, the tendency of the pilot valve to inadvertently close is unacceptable in a modulating valve since it drives the main valve to a closed position when it is not desired.

In my prior U.S. Pat. No. 4,863,098, another system for preventing inadvertent valve closure is disclosed. In that control valve an actuator pilot seal functions only to initiate opening and closing movement of the main valve and does not modulate pressure in the intermediate chamber, which is performed by a secondary valve modulating flow through an offset passage. Because of this the actuator, and particularly the actuator pilot seal, is by design positioned sufficiently far away from the central pilot passage in the control valve assembly so that when the secondary valve is modulating or restricting the offset passage, it is unaffected by pilot passage pressure or pressure differential forces and, hence there is no significant differential fluid pressure force acting on the actuator when the control valve is open. Since the differential pressure force acting on the actuator remains essentially zero during modulation, transient changes in intermediate chamber pressure create no imbalance of the forces acting on the actuator and hence no unwanted downward pilot actuator forces. The force balance and position of the control valve utilizing the secondary valve is inherently stable. That is, whenever transient conditions occur to upset the desired force balance across the control valve, the secondary valve either opens or restricts to change the intermediate chamber pressure. This causes movement of the control valve in a direction opposite to the disturbing transient so that the correct control valve force balance is always maintained.

Furthermore, the significant spacing of the actuator pilot seal from the pilot passage also reduces the likelihood of other factors causing inadvertent downward relative movement of the actuator including transient inlet fluid pressure rise and transient current dips in the coil.

According to another embodiment disclosed in my prior patent, the pivotal secondary valve is replaced with a valve disk fixed to the lower end of the actuator that actuates a poppet valve reciprocably mounted in a stepped bore in the valve assembly interconnecting the inlet chamber and the intermediate chamber. This embodiment operates in the same manner and has the same advantages of the pivotal secondary valve in the first embodiment except for the mechanical advantage achieved by the pivotal valve. In the second embodiment, however, no spring is required to bias the secondary poppet valve to its closed position since the valve is constructed to be flow responsive and is made of a light-weight plastic to achieve buoyancy toward the valve closed position.

Another problem in pilot operated flow modulating control valves is a tendency for the main valve member to chatter or vibrate when the valve is very close to seat when both opening and closing. This problem is also related to the well known "water hammer" effect in which a hydraulic shock wave is caused by the rapid opening and closing movement of control and shut-off valves in hydraulic systems.

It is a primary object of the present invention to ameliorate the problems noted above in pilot operated diaphragm control valves.

SUMMARY OF THE PRESENT INVENTION

In accordance with the present invention a fluid flow modulating control valve is provided with precise and infinite flow modulation throughout its range of movement, achieved by designing the valve's pilot operation so the force vs. displacement curves of the opening and closing forces acting on the pilot have substantially different slopes and intersect throughout the range of movement of the pilot to achieve infinite pilot balance positions.

The basic configuration of the valve is quite simple and similar to prior on-off solenoid operated fluid shut-off valves. A diaphragm-type main valve controls flow through a main seat between inlet and outlet and defines an intermediate chamber. Pressure in the intermediate chamber is controlled by a bleed passage to inlet and a controlled pilot passage to outlet. An electromagnetically driven armature with a seal at one end variably restricts the pilot passage to unbalance and then balance fluid forces acting on the main valve to cause it to follow movement of the armature.

The closing forces acting on the armature include the spring force which increases with displacement and a net fluid force in the intermediate chamber acting on the opposite ends of the armature. This net fluid force decreases as the armature seal moves away from the pilot passage and then increases as the valve member follows the armature to its new position where the pilot passage is again restricted by the armature seal.

The combined closing forces of the spring and the net fluid pressure acting on the armature define a force vs. displacement curve that is important in this discussion.

The electromagnetic forces acting on the armature in an armature opening direction and in opposition to the closing forces provide another force vs. displacement curve, and in fact a plurality of curves for different applied voltages, one for each of the desired armature modulation positions.

In accordance with the present invention, precise flow modulation is achieved by designing the valve so the combined closing force vs. displacement curve and the armature opening force vs. displacement curves have substantially different slopes and intersect throughout the modulation range of the valve.

The slope characteristics of both of these force vs. displacement curves can be achieved in a variety of ways. The simplest way is to increase the spring constant of the armature closing spring. This gives the combined closing force vs. displacement curve a more positive slope where it is more readily intersected by the electromagnetic opening force vs. displacement curves which may have a positive, zero, or negative slope. The higher spring constant approach however, increases the power requirements of the valve due to the heavier spring, so that it is preferable to achieve these results by combining a lower increase in spring constant with some other modification.

This includes designing the electromagnetic circuit so its force vs. displacement curves acting on the armature are somewhat negative. This is achieved by increasing armature length so the armature covers a gap between armature pole pieces when the valve is closed.

An ancillary and important design feature of the present valve is an angular seating and unseating movement of the main valve that eliminates valve vibration or chattering when the valve is very near the main seat in the valve body. While this design is particularly useful with the present flow modulating valve, it also has utility in other flow modulating valves and some shut-off type valves.

There is a variety of embodiments disclosed herein to effect angular valve movement near its seat. In one, a main valve spring urges the control valve only on one side permitting the valve to tilt as it opens and closes. In two others, the seats are slightly angular and in a fourth, the entire control valve is offset transversely from the axis of the valve body seat.

The effect of this valve tilting action is a more gradual increase and decrease of flow area, in fact results in a 50% reduction from the point where the tilted poppet makes contact with the valve seat to the point of shut-off. This has the ancillary benefit of water hammer effect reduction.

Other objects and advantages of the present invention will be more readily apparent from the following detailed description.

DETAILED DESCRIPTION OF THE PREFERRED EMBODIMENTS

Figure 1:
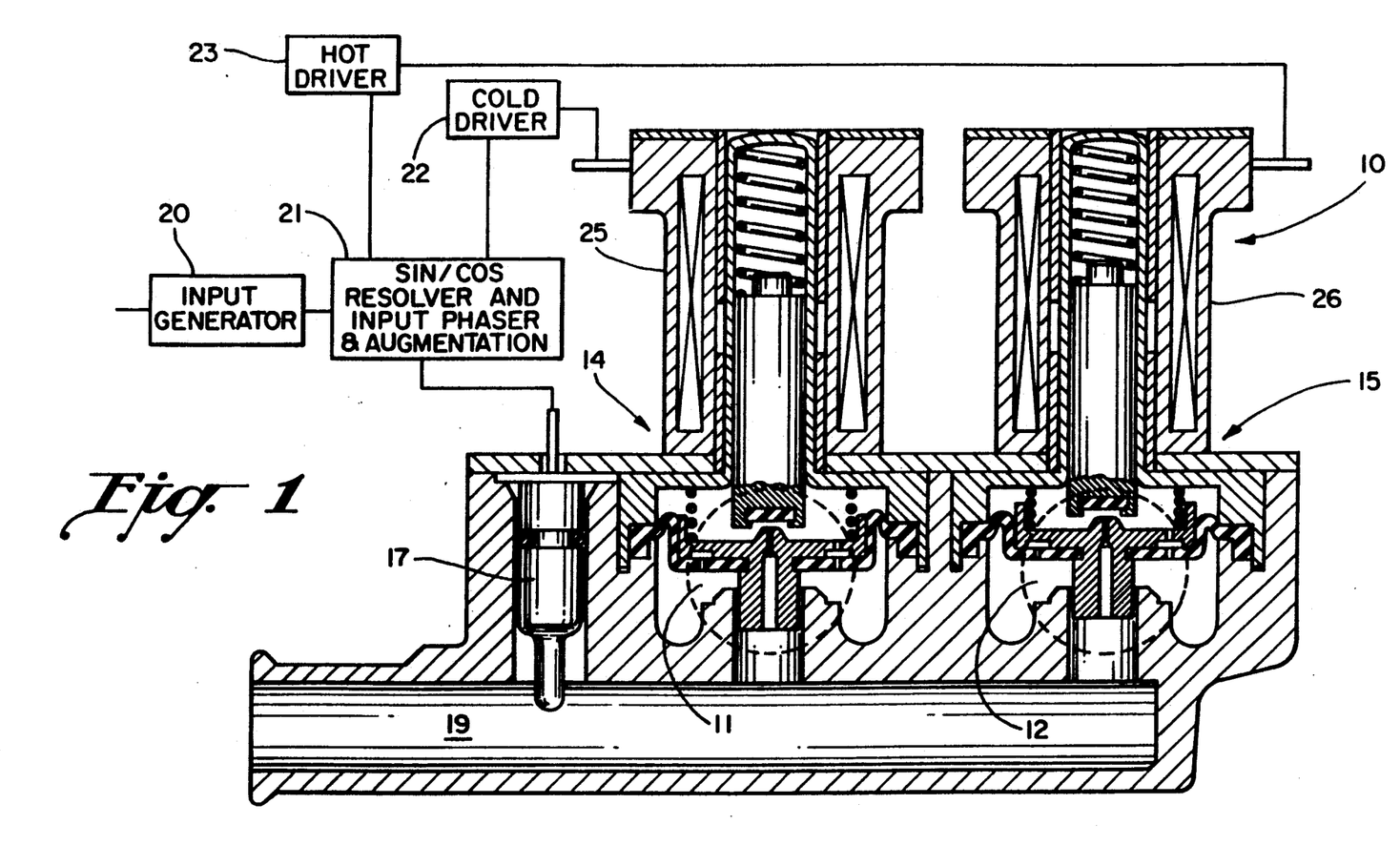
FIG. 1 is a longitudinal section of a mixing valve assembly incorporating two of the flow modulating valves according to the present invention.

Referring to the drawings and particularly FIG. 1, a mixing valve assembly 10 is illustrated generally adapted to mix cold water from a cold water inlet 11 with hot water from a hot water inlet 12 to provide water to an associated appliance at a pre-selected temperature as desired.

Mixing valve 10 generally includes a fluid flow modulating pilot operated control valve assembly 14 for controlling cold water flow and an identical flow modulating valve assembly 15 for controlling hot water flow, and a temperature sensor 17 projecting into an outlet passage 19 where hot and cold water from valves 14 and 15 mix.

The valves 14 and 15 are controlled by an electronic circuit that includes an Input Generator 20 for deriving variable signals representing the desired temperature, a SIN/COS Resolver and Input Phaser 21 that receives actual temperature signals from the temperature sensor 17 and provides DC signals to cold driver 22 and hot driver 23 which respectively provide the appropriate coil current for electromagnetic coil assembles 25 and 26 associated with the valves 15 and 16 respectively.

The valves 14 and 15 are identical, and thus will be described in detail with respect to the embodiments shown in FIGS. 2 to 12 which illustrate the present flow modulating valve as a single valve unit, but it should be understood in connection with the FIG. 1 embodiment, as well as the remaining embodiments, that the control valve assembly according to the present invention is capable of infinite modulation of fluid flow within the range of motion of the control valve assembly, and this characteristic is useful in a wide variety of applications and is particularly useful in the two valve mixing valve assembly illustrated in FIG. 1.

The Input Generator 20 develops a pulse train that is phase responsive to an input representing the desired temperature water from outlet passage 19. The SIN/COS Resolver and Input Phaser 21 derive SIN and COS signals that are phased with the pulse train from the input generator 20. The SIN/COS Resolver also phases a pulse train in response to the magnitude of input from the temperature sensor 17 and utilizes this actual temperature sensor pulse train to pick off the DC instantaneous values of the phased SIN and COS signals and utilizes these two as inputs to the cold driver 22 and the hot driver 23. Such SIN/COS Resolvers are conventional and, therefore, the details of the circuitry are unnecessary to the present invention.

Figure 2:
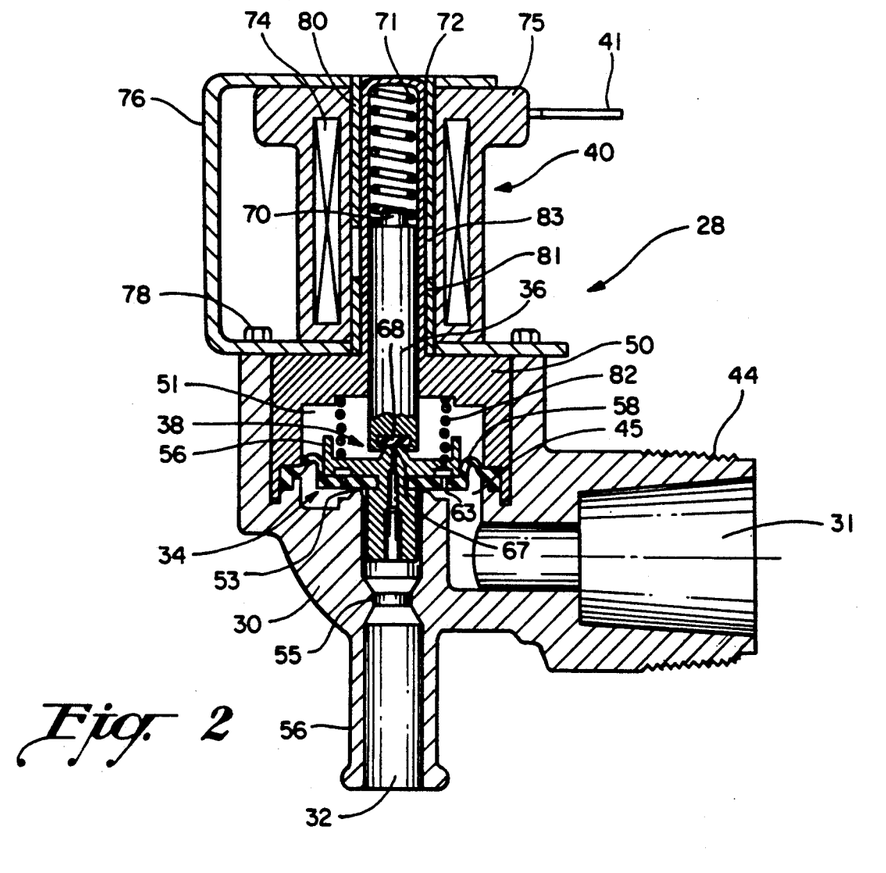
FIG. 2 is a longitudinal section of a single flow modulating control valve assembly according to the present invention with the valve shown in its closed position.

Note that both actuators are somewhat open in FIG. 1, and the actuator illustrated in FIG. 2 is closed. Note also in FIG. 1, the main valve or valve 15 is opened greater than the main valve of valve 14 to illustrate operation of the mixing valve in proportioning the flows of the hot and cold fluids into the mix chamber 19.

The mixing valve 10 is capable of providing an infinite combination of cold water flow rate from valve 14 and hot water flow rate from hot water valve 15 in an improved manner heretofore not capable in known hot and cold water appliance type mixing valves.

Reference now turns to the embodiment illustrated in FIGS. 2 to 6 which shows a single flow modulating pilot operated valve assembly 28 according to the present invention and it can be readily seen that the operating components thereof are identical to those in the valves 14 and 15 in the FIG. 1 embodiment, so that the following description of valve 2 applies to the valves 14 and 15 in FIG. 1 as well.

Flow modulating control valve assembly 28 generally includes a valve body 30 having an inlet 31 and an outlet 32, a main control valve assembly 34, an armature 36 that forms part of a pilot valve 38 and an electromagnetic coil assembly 40 for positioning the armature 36 in any incremental vertical position within its range of movement in accordance with the magnitude of current in its coil. Coil current is applied to coil assembly 40 through terminals 41.

The body 30 is constructed of suitable plastic, such as polypropylene, and includes an inlet fitting 44 surrounding inlet 31 connected to an inlet chamber 45 so that the pressure of inlet fluid in chamber 45 tends to bias the main valve assembly 34 upwardly. Assembly 34 defines in a housing cover member 50 an intermediate chamber 51 and fluid pressure in that intermediate chamber tends to bias the modulating valve assembly 34 downwardly toward its closed position in engagement with an integral main valve seat 53 in the housing coaxial with a stepped outlet passage 55 which is part of outlet 32, ending in an outlet fitting 56.

The control valve assembly 34 includes an annular rigid plastic insert 56 fixed to the upper surface of a flexible diaphragm 58 that includes a thick fairly firm central portion 59, a bellows portion 61, and an annular flange portion 62 that is clamped between the cover 50 and the housing body 30. Bleed passages 63 in central portion 59 and orifice 69 in insert 56 communicate intermediate chamber 51 with inlet chamber 45.

The insert 56 has a central stepped pilot passage 64 therethrough that communicates the intermediate chamber 51 with the outlet passage 55, and it opens at its upper end through a frusto-conical projection 66 at orifice 67. The top of projection 66 defines a valve seat for pilot valve 38. Orifice 67 is variably restricted by an elastomeric seal 68 carried by the lower end of armature 36, and this variable restriction of orifice 67 creates the unbalancing and balancing of the main control valve 34. Seal 68, orifice 67, and orifice 69 define the pilot valve 38.

The armature 36 is cylindrical in configuration and has a reduced upper projection 70 that forms a seat for a coil compression spring 71 seated in a closed ended armature guide tube 72 formed integrally with cover 50. Spring 71 urges armature 36 toward pilot valve orifice 67 in insert 56, and operates in opposition to the electromagnetic flux force created by coil assembly 40 which urges the actuator upwardly into guide tube 72.

The coil assembly 40 includes an annular coil 74 encased in a molded housing 75 carried by a channel-shaped metal frame 76 fixed to the body 30 by a plurality of fasteners 78.

Mounted between housing 75 and guide tube 72 is a pair of armature pole pieces 80 and 81 spaced from one another defining there-between an annular gap 83.

Before discussing the specific features which enable the valve 28 to achieve infinite flow modulation within its range, it is believed helpful at this point to briefly discuss the general mode of operation of the valve in achieving modulation.

When coil 74 is energized, an upward force is imparted on armature 36 and opposing that force is a downward hydraulic force at orifice 67 due to the area of the orifice and a differential pressure between intermediate chamber 51 and outlet 32, and the downward force of spring 71. The downward forces of the spring and the hydraulic force are additive and oppose the single upward magnetic force acting on the armature when the coil is energized. When the downward forces acting on the armature equal the upper forces acting on the armature, an equilibrium point is achieved.

Figure 4:
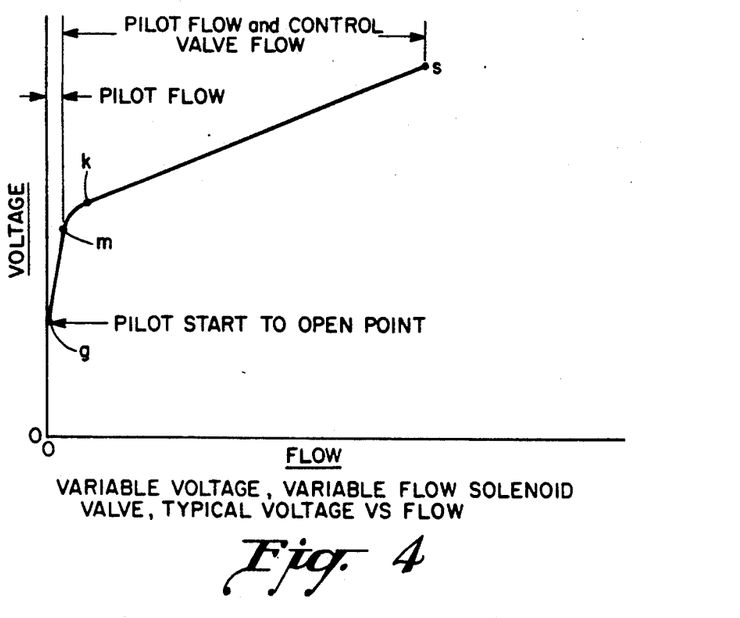
FIG. 4 is an x-y diagram of a voltage vs. flow curve for the flow modulating valve according to the present invention.

As more voltage is applied to coil 74, armature 36 and particularly seal 68 uncovers orifice 67 to a greater extent until enough voltage is applied to cause the armature to lift seal 68 far enough from the orifice so that the pilot flow now increases enough through orifices 67 and 69 to bring control valve 3 to its balance point. In FIG. 4, point g is the start of pilot flow and the point where enough voltage has been applied to coil 74 where the magnetic forces acting on the armature are just equal to the opposing force of the armature spring 71 and the hydraulic force due to the pressure differential acting across orifice 67 on the armature. Flow from point g to m is due to pilot flow only, and point m is where the voltage has been increased sufficiently so that seal 68 has opened orifice 67 enough to cause flow through the orifices 67 and 69 to place the control valve assembly 34 at its balance point.

A further voltage increment lifts seal 68 further from orifice 67 to further increase flow through the orifices 67 and 69 to unbalance assembly 34 and cause it to lift off seat 53 only a small incremental amount. As the valve assembly 34 lifts this incremental amount, orifice 67 will again restrict due to the upward movement of the valve which brings orifice 67 in closer proximity to seal 68. This in turn causes the control valve 34 to move away from the armature 36 and back toward seat 53. As the valve assembly 34 moves toward seat 53, orifice 67 moves away from seal 68 to cause flow to increase through orifices 67 and 69 and cause valve assembly 34 to again unbalance and move away from seat 53. This process repeats until valve assembly 34 is maintained in a fixed position as it continually seeks a balance point due to the changes in flow in orifices 67 and 69 as orifice 67 moves toward and away from seal 68. This is in the region from point m to s as shown in the curve of FIG. 4. In the region of point m to k of this flow curve, both pilot flow through orifices 67 and 69 and control valve flow each make a significant component of the total valve flow. Beyond point k, control valve 34 is lifted enough to where the major component of flow goes through the control valve seat 53 and little flow or negligible flow is contributed by flow through the orifices 67 and 69. Thus, with each position of the armature 36, the control valve 34 follows the armature to establish equilibrium positions throughout the stroke of the armature.

Note also that the control valve assembly 34 has its own biasing spring 82 which is not essential but is preferred since it tends to add stability of flow through the valve and provides additional closure force to control valve 34 for improved leak-tight seating at low operating pressures.

The principal reason the present flow modulating control valve assembly is capable of achieving this precise and infinite flow modulation throughout the range of movement of the valve, is that the slope of the force vs. displacement opening force curves for opening forces acting on the armature is significantly different from the slope of the closing force curves for closing forces acting on the armature, so that they intersect throughout the range of movement of the armature 36. This slope differentiation and how it is achieved can be seen with reference to FIG. 6.

Figure 6:
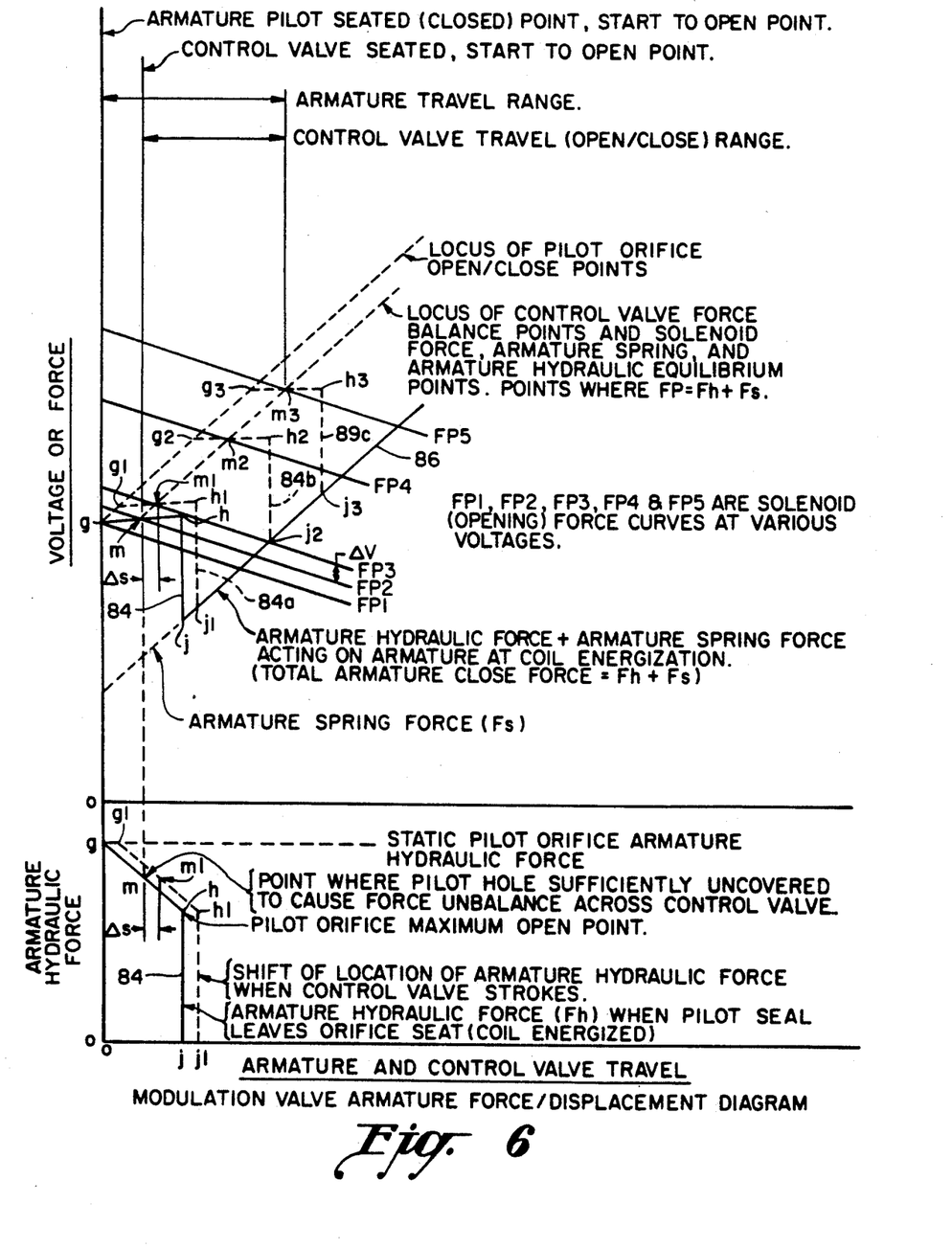
FIG. 6 is an x-y diagram of a voltage or force vs. displacement curves including solenoid force curves, spring closing force curve and hydraulic closing force curve for the flow modulating control valve assembly ac-cording to the present invention.

The net hydraulic force acting on the armature 36 created by orifice 67 is depicted by curve 84 at the bottom of FIG. 6. This curve 84 represents the hydraulic closing force acting on the armature and is labeled $F_h$ on the diagrams and herein. The point g is the hydraulic force when the pilot orifice is closed and is the point where maximum hydraulic force acts on the armature. As the armature moves the pilot seal 68 away from the orifice 67, a pilot flow begins through orifices 67 and 69. Since pilot flow occurs from chamber 45 to chamber 51 to outlet 32, a pressure drop occurs across orifices 67 and 69. As the armature 36 is caused to stroke upwardly by application of increased voltage, orifice 67 becomes more uncovered causing flow through the orifices 67 and 69 to increase. As flow through orifices 67 and 69 increases, the pressure drop from chamber 45 to intermediate chamber 51 increases, and the pressure drop from chamber 51 to outlet 32 decreases. The pressure drop decrease that occurs across orifice 67 as the armature strokes to uncover the orifice to a larger opening is shown as the force decrease from g to h in FIG. 6 on the $F_h$ curve.

As the armature 36 moves to some intermediate or stroke position, it reaches a point where further movement adds little to cause flow through orifices 67 and 69 to increase. At this point, the proximity of the armature seal 68 is at such a distance that the effective pilot valve hydraulic force $F_h$ diminishes rapidly and is depicted by h to j points on the force curve.

Also, as the armature 68 moves to uncover orifice 67, flow increases to where the pressure drop across the orifice 69 acts against its area of the control valve 34 in an ever increasing upward force. At some stroke position of armature 36, orifice 67 is uncovered to a point where a force balance of the control valve 34 occurs. This is due to the pressure drops occurring across orifices 67 and 69 and their respective control valve areas. This point is depicted by the point m on the curve $F_h$-84. When point m is reached, the forces acting on the armature are in equilibrium and the control valve is also in force balance. Point m is reached by increasing voltages applied to coil 74.

An understanding of the hydraulic force curve 84 in the lower part of FIG. 6 is necessary because its values must be added to the armature spring force values shown in the upper curves of FIG. 6. In the upper curves of FIG. 6, the negatively sloped lines $F_{P1}$, $F_{P2}$, $F_{P3}$, $F_{P4}$, and $F_{P5}$ are the solenoid opening force curves at various input voltages to coil 74.

Figure 3:
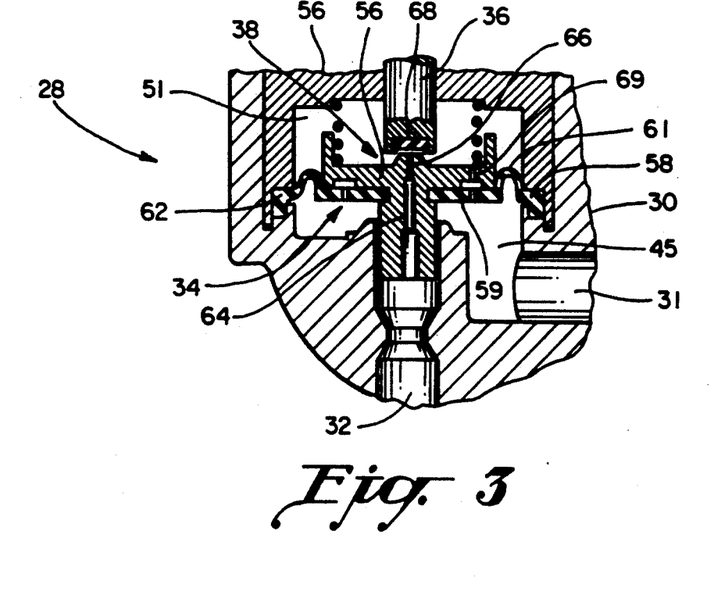
FIG. 3 is a fragmentary view similar to FIG. 2 with the control valve in an intermediate modulating equilibrium position.

The slope of the curves $F_P$ is determined by the design of the electromagnetic assembly 40. As seen in FIGS. 2 and 3, the magnetic circuit is composed of the tubular pole pieces 80 and 81, the channel-shaped frame 76 and armature 36. The design of the solenoid force curves is influenced mostly by extending or lengthening the upper end of armature 36 above the gap 83 when the armature is in its down position illustrated in FIG. 2. This assures that the slope of the solenoid force curves be significantly negative.

The force $F_s$ acting on armature 36 depicted in the upper curves of FIG. 6 is the armature closing force of spring 71 identified as curve 86. The degree of positive slope of spring force curve 86 is of course determined by the spring constant of spring 71 and according to the present invention, its spring constant is substantially higher than in similarly constructed pilot operated shutoff valves.

Since the closing spring force $F_s$ and the closing hydraulic force $F_h$ act in the same direction, they must be added together to determine where the solenoid opening force curves $F_P$ intersect the total armature closing force. In the upper curves of FIG. 6, the curve portions g, h, j represent the total armature closing force, and it can be seen that the portion of this curve between g and h is positive, and it is this portion of the curve that is intersected by the opening force curves to achieve the equilibrium positions $m_1$, $m_2$, $m_3$ where forces are balanced on the armature 36 and on the control valve 34.

It can be readily seen that if a lower spring constant was selected for spring 71 that the slope of the spring force curve 86 would decrease as would the slope of the total closing force curve between g and h, and at some point would be parallel to or have a lesser slope than the solenoid opening force curves $F_p$. Under these conditions, intersection of force curve g-h and $F_p$ could not occur at point m and therefore the locus of the points of intersection of the opening and closing forces $m_1$, $m_2$ and $m_3$ would be non-existent and the valve would be incapable to modulate flow.

Thus, according to the present invention the electromagnetic coil assembly 40 and the spring constant of armature spring 71 are designed so that the slope of the total closing force curve between g and h is substantially greater than the slope of the opening force curves $F_P$. This slope differentiation can be achieved by a higher spring constant for spring 71 to increase the slope of curve 86 or by modifying the design of the solenoid of the electromagnetic assembly 41 to achieve more negatively sloped curves $F_P$, or compromising combinations of both. That is for example, the solenoid assembly may be designed so that the opening force curves $F_P$ have a more zero slope if a higher spring constant for spring 71 is selected, and conversely a lower spring constant may be selected by designing the electromagnetic assembly 40 so that the opening force curves $F_P$ are more negatively sloped.

Figure 5:
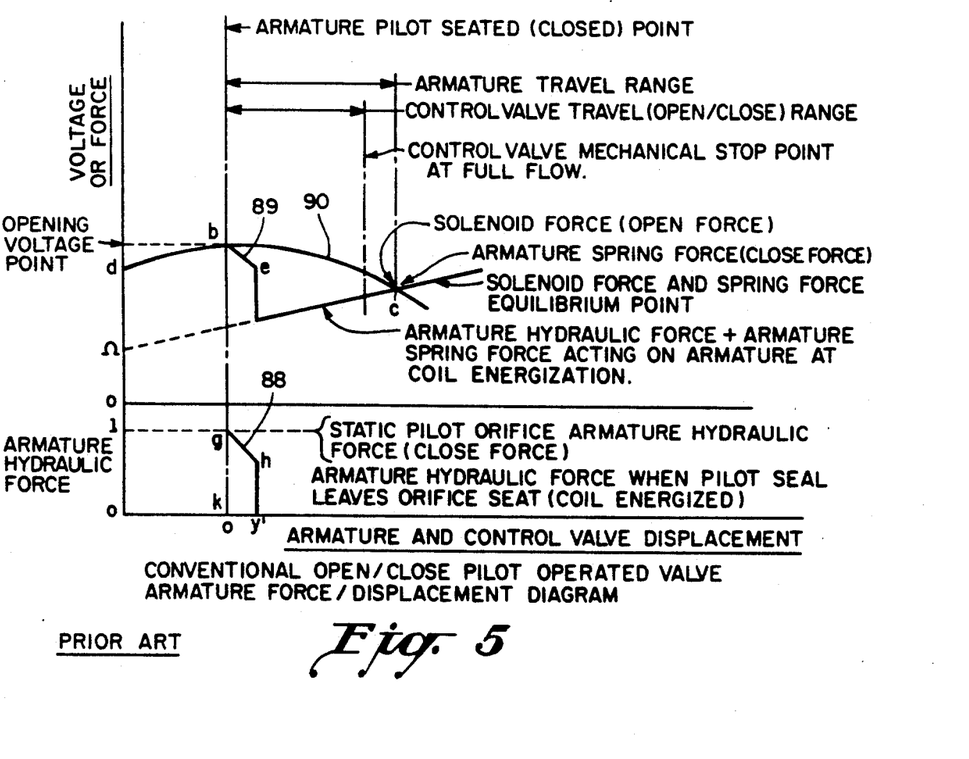
FIG. 5 is an x-y diagram of a voltage or force vs. armature displacement curves for the solenoid opening force and closing forces for a conventional pilot operated shut-off valve.

The above described design of the present valve can be distinguished from a conventional pilot operated diaphragm valve by viewing the curves of FIG. 5 which are similarly numbered and lettered except for point C to FIG. 6, with the lower curve ghy' 88 being the hydraulic closing force curve, the upper curve 89 representing the total closing force curve, and curve 90 representing the solenoid opening force curve. It can readily be seen that the slope of a portion of the total closing force curve b,e is substantially less than the slope of the opening force curve 90. When voltage is brought to a value where the solenoid open force curve reaches point b, the magnetic force from b to c exceeds the armature closing forces until the armature reaches an equilibrium with its spring force at Point C. Thus the pilot armature in a conventional solenoid valve does not reach an equilibrium along the b to e section of the 89 curve which is necessary to achieve control valve modulation. Therefore, the conventional solenoid valve when operated can only control the pilot orifice to a close or full open position and as a result, the control valve is either in a full open or close position and thereby cannot be positioned to perform as a modulating valve.

Another important aspect of the present invention is a valve tilting system described in connection with FIGS. 7 to 12, that minimizes vibration or chattering of the control valve 34 on seat 55 when the valve 34 is very near the seat during both opening and closing movements. This tilting system also reduces water hammer characteristics of valves of this general type. These tilting systems provide a means to more gradually increase or decrease the control valve flow area when the seat operates at low flow or near its shut-off point.

In the embodiments illustrated in all of FIGS. 7 to 12, the control valve undergoes a slight rotation in a vertical plane when the valve either moves on or off its seated position. In each case the control valve seat moves through an angle x during its opening and closing movement.

Figure 7:
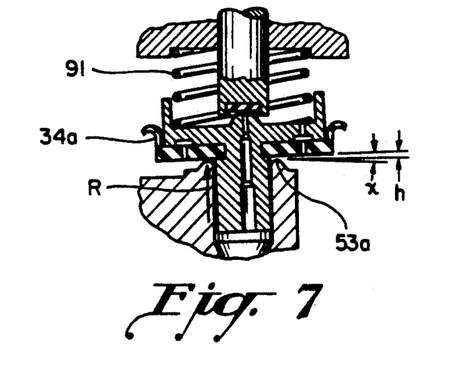
FIG. 7 is a fragmentary section illustrating a valve tilting system useable with the control valve assembly illustrated in FIGS. 2 and 3

In FIG. 7, tilting movement is created by an open end compression spring 91 with an eccentric force acting on the valve 34a, which is in contact with control valve seat 53a at a reaction point R. As the control valve moves either up or down, the eccentric force acting on the valve causes it to be in contact with the valve body seat at R and the control valve seat rotates or tilts about this reaction point. At the time of contact of the control valve seat at R or at the time the control valve seat leaves R, the valve opening is at a height(h) above the body seat 53a. The control valve flow area of opening at (h) is one-half the area that would exist had the control valve opened or lifted evenly through the height(h). In effect, by causing this rotation or tilting of the control valve near its seated position, the control valve area undergoes a more gradual area change with control valve stroke and thereby can be used to reduce valve voltage sensitivity at low flow values. Also, as the control valve moves to open or close near the low flow positions, the rotation about point R provides a support point for the control valve seat in a manner to add stability or dampening effect to the control valve and in this manner prevents undesirable vibration at low flow values.

Figure 8:
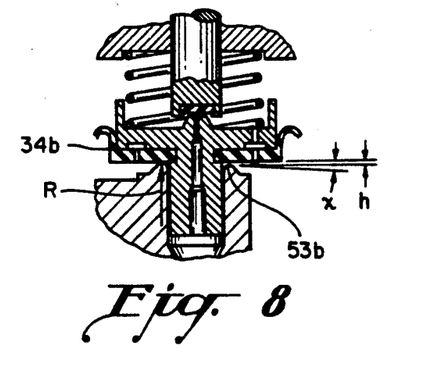
FIG. 8 is a fragmentary section of another embodiment showing a different tilting system according to the present invention.

In the FIG. 8 embodiment, seat 53b is slightly angled through an angle x, and the control valve moves up or down relatively evenly until it contacts the angled seat at R. When the control valve seat is in contact with point R, movement upward or down of the control valve provides a similar rotational action described in connection with FIG. 7.

Figure 9:
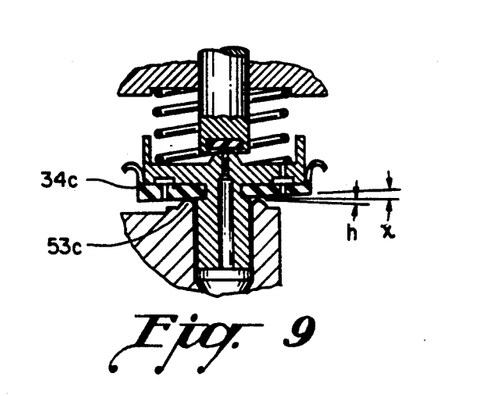
FIG. 9 is a fragmentary section of still another tilting system according to the present invention.

In the FIG. 9 embodiment, instead of slanting the body seat as in FIG. 8, the control valve seat has been angled to provide the desired control valve rotation as previously described, although the angle of the seat on valve 34c in FIG. 9 has been exaggerated only for illustrative purposes.

Figure 10:
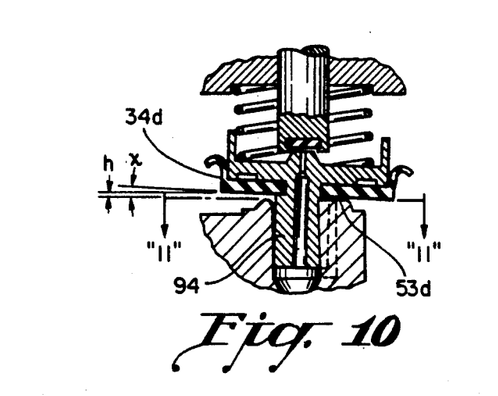
FIG. 10 is a fragmentary section of still another tilting system according to the present invention.

In the FIG. 10 embodiment, an eccentric force the control valve 34d is obtained hydraulically. B—B is the axis of the control valve 34d and C—C is the axis of the control valve seat 53d. Ribs 93 which are below seat 53d are somewhat radially spaced and numbered to effectively guide cylindrical member 94 within the eccentric seat 53d. The valve body seat is offset from the control axis B—B by an amount indicated at e. The mechanical control valve axis is B—B but since the valve body seat has been offset a distance e, the control valve opposing open/close forces now act eccentrically to each other and thereby cause an uneven loading across the control valve and imparts a moment and rotation to the control valve. In other words, in the control valve 34d, the upwardly acting forces act through the centroid of the area of the control valve generally bounded by its outside diameter and downward forces act through the centroid of an area bounded by the valve seat 53d. Since these upward and downward forces are not acting concentrically to each other, a moment is created hydraulically as shown in the respective area drawings in FIG. 12.

Figures 11, 12, 13, 14:
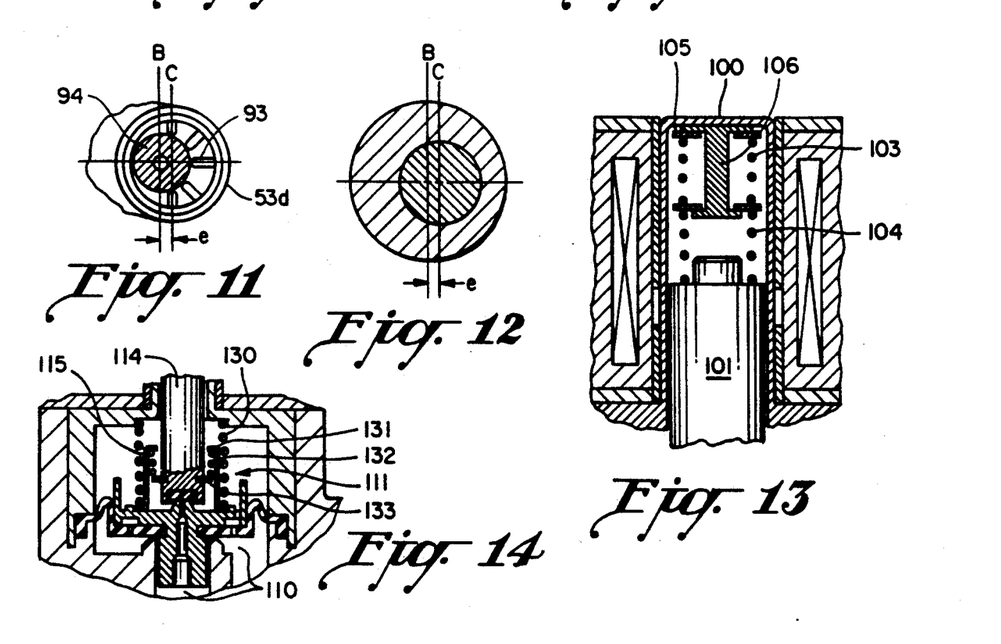
FIG. 11 is a cross-section taken generally along line 11—11 of FIG. 10.
FIG. 12 is a cross-sectional diagram illustrating the respective cross-sectional force areas of the valve illustrated in FIG. 10.
FIG. 13 is a fragmentary section of a dual spring assembly that may be used as an alternative to the spring assembly illustrated in FIG. 2.
FIG. 14 is a fragmentary longitudinal section of another embodiment of the present flow modulating control valve assembly.

A modification of the armature spring assembly is illustrated in FIG. 13 that allows the use of a higher spring constant at the low end of the force vs. voltage curve and a lower spring constant at the high end of the curve. At the high flow part of the flow curve of a given value, the spring rate can be lower as a larger incremental control valve stroke can be tolerated with a given voltage change since the larger control valve incremental stroke at higher flow values does not give the larger percentage of flow change as would be experienced with that same incremental control valve stroke in the initial or low part of the flow curve. In general, as the spring constant is lowered, the incremental stroke of the control valve increases for a given incremental voltage change.

As seen in FIG. 13, armature guide tube 100 contains a double spring arrangement that reduces the force build-up on armature 101 due to the large force build-up as might occur with a single spring with a high spring constant, that is, a spring with a highly sloped force curve. A reduction of force build-up on the armature would help reduce coil requirements with its obvious advantages. A low spring constant spring 103 is preloaded by washers 105. Spring 103 and washers 105 are slidable on a rivet member 106 and are retained as an assembly by riveting the end of member 106. Spring 104 has a higher spring constant and engages lower washer 105 and armature 101. Spring 103 in assembly is compressed sufficiently so that its force is great enough to prevent it from being deflected when engaged with spring 104 when armature 101 is in its de-energized position. In operation, as voltage to the solenoid is increased to cause armature 101 to lift, spring 104 will initially deflect until armature 101 lifts an additional amount due to the increase of coil voltage to the point where the high spring constant force exceeds the pre-set force of spring 103. At that point, where the force of spring 104 exceeds the force of spring 103, the slope of the force curve on armature 101 is now reduced and will thus allow the armature to move a further distance for a given voltage increment.

In FIG. 14 another modification is illustrated. valve 110 has a biasing assembly 111 that includes spring 130 which biases the valve downwardly. A cup shaped retainer 131 is biased against the valve 110 by the spring 130 and houses spring 132 that reacts between retainer 131 and a snap ring 133 carried by armature 114 to bias the armature downwardly. Because spring 132 moves with the valve 110, its force range acting on armature 114 is far narrower than for spring 71 in the FIG. 2 embodiment. Spring 132 provides the high spring constant function of spring 71 of FIG. 2. The high spring rate of spring 132 and the pilot hydraulic force add together as they do in the FIG. 2 valve and thereby permit the total closing force curves to intersect the magnetic force curve properly and allow modulation of the valve to occur as described for the valve of FIG. 2. The FIG. 14 valve will operate with and without a spring at the top end of the armature.

I claim:

1. A fluid flow modulating control valve assembly, comprising: a valve body having an inlet and an outlet and a valve seat between the inlet and the outlet, a control valve in the valve body engageable with the valve seat and defining an intermediate chamber in the valve body, a bleed passage in the control valve communicating the inlet with the intermediate chamber to provide a valve closing force, a pilot passage in the control valve communicating the intermediate chamber and the outlet, a pair of spaced stationary pole pieces, an armature slidably mounted in the pole pieces adjacent the control valve having an end seal for controlling the pilot passage, spring means biasing the armature toward the pilot passage, said armature end seal and the pilot passage providing both an on-off function of the control valve and a flow modulation function thereof, said armature being mechanically uncoupled to the control valve, said armature being also biased toward the pilot passage by a fluid pressure force in the intermediate chamber, an electromagnetic device for positioning the armature away from the control valve against the biasing force of the spring means, and modulation means providing infinite flow modulation for the control valve assembly without the use of a valve secondary to the armature seal and pilot passage including means for modulating the armature seal very close to the pilot passage throughout the range of movement of the armature by selecting a spring constant for the spring means sufficiently high so the slope of the force vs. displacement curve for the combined fluid pressure forces and spring means force is substantially different from the voltage-displacement curve for the electromagnetic device acting on the armature so the opening force curves and the total closing force curve intersect throughout the range of movement of the armature, said electromagnetic device and armature being constructed to produce negatively sloped force vs. displacement curves for the opening forces acting on the armature.

2. A fluid flow modulating control valve assembly as defined in claim 1, wherein the spaced pole pieces define therebetween a gap, said armature being sufficiently long so it covers the gap completely when the armature is nearest the valve seat.

3. A fluid flow modulating control valve assembly, comprising: a valve body having an inlet and an outlet and a valve seat between the inlet and the outlet, a control valve in the valve body engageable with the valve seat and defining an intermediate chamber in the valve body, a bleed passage in the control valve communicating the inlet with the intermediate chamber to provide a valve closing force, a pilot passage in the control valve communicating the intermediate chamber and the outlet, a pair of spaced stationary pole pieces, an armature slidably mounted in the pole pieces adjacent the control valve having an end seal for controlling the pilot passage, said armature being mechanically uncoupled to the control valve, said armature end seal and the pilot passage providing both an on-off function of the control valve and a flow modulation function thereof, spring means biasing the armature toward the pilot passage, said armature being also biased toward the pilot passage by a fluid pressure force in the intermediate chamber, an electromagnetic device for positioning the armature away from the control valve against the biasing force of the spring means, and modulation means providing infinite flow modulation for the control valve assembly without the use of a valve secondary to the armature seal and inlet passage including means for modulating the armature seal very close to the pilot passage throughout the range of movement of the armature by constructing the electromagnetic device so the voltage-displacement curves for the electromagnetic device acting on the armature has a slope substantially less than the slope of the force vs. displacement curve for the combined fluid pressure force and the spring means force acting on the armature in the range of modulation for the control valve assembly, said electromagnetic device and armature being constructed to produce negatively sloped force vs. displacement curves for the opening forces acting on the armature.

4. A fluid flow modulating control valve assembly as defined in claim 3, wherein the spaced pole pieces define a gap therebetween, said armature being sufficiently long so it covers the gap completely when the armature is nearest the valve seat.

5. A fluid flow modulating control valve assembly as defined in claim 3, wherein the modulation means includes selecting a spring constant for the spring means so the slope of the force vs. displacement curve is substantially positive.

6. A fluid flow modulating control valve assembly, comprising: a valve body having an inlet and an outlet and a valve seat between the inlet and the outlet, a control valve in the valve body engageable with the valve seat and defining an intermediate chamber in the valve body, a bleed passage in the control valve communicating the inlet with the intermediate chamber to provide a valve closing force, a pilot passage in the control valve communicating the intermediate chamber and the outlet, a pair of spaced stationary pole pieces, an armature slidably mounted in the pole pieces adjacent the control valve having an end seal for controlling the pilot passage, said armature being mechanically uncoupled to the control valve, said armature and seal and the pilot passage providing both an on-off function of the control valve and a flow modulation function thereof, spring means biasing the armature toward the pilot passage, said armature being also biased toward the pilot passage by a fluid pressure force in the intermediate chamber, an electromagnetic device for positioning the armature away from the control valve against the biasing force of the spring means, and modulating means providing infinite flow modulation for the control valve assembly without the use of a valve secondary to the armature seal and pilot passage including means for modulating the armature seal very close to the pilot passage throughout the range of movement of the armature, selecting a spring constant for the spring means sufficiently high so the slope of the force vs. displacement curve for the combined fluid pressure force and spring means force is substantially greater than the slope of the voltage vs. displacement curve for the electromagnetic device acting on the armature in the modulation range of the control valve assembly, said spring constant for the spring means being sufficiently high so the slope of the force vs. displacement curve for the combined forces is substantially positive, and the electromagnetic device having spaced pole pieces defining there-between a gap, said electromagnetic device and armature being constructed to produce negatively sloped force vs. displacement curves for the opening forces acting on the armature including said armature being sufficiently long so its other end covers the gap completely when the armature is nearest the valve seat whereby the voltage vs. displacement curves are negative.

* * * * *